Dec. 26, 1967 J. A. GRANT 3,360,274
LIP SEAL WITH SUPPORTING LIP
Filed May 12, 1965
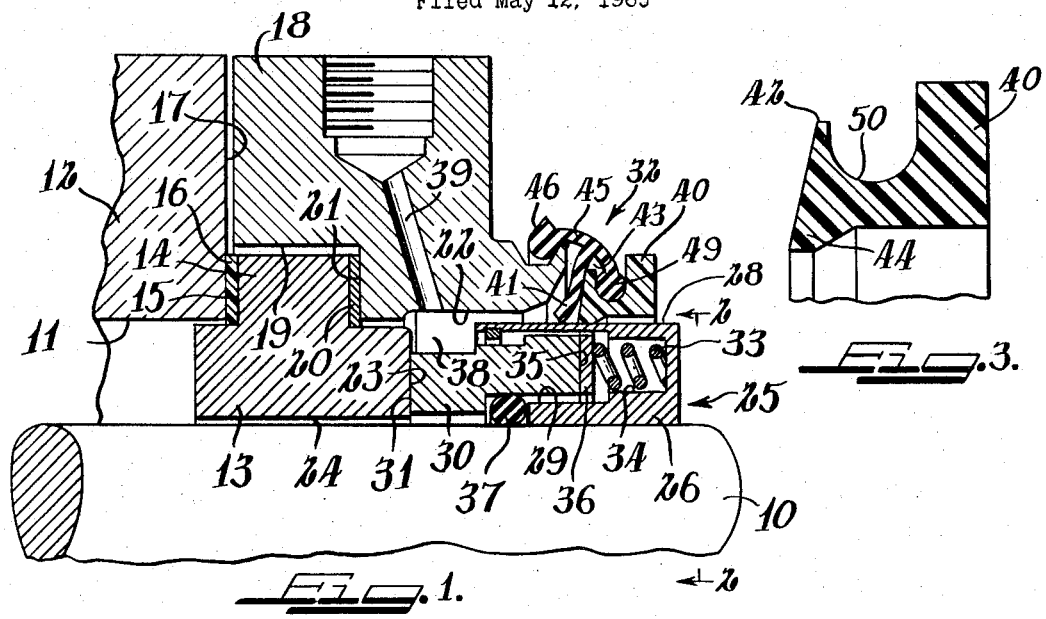
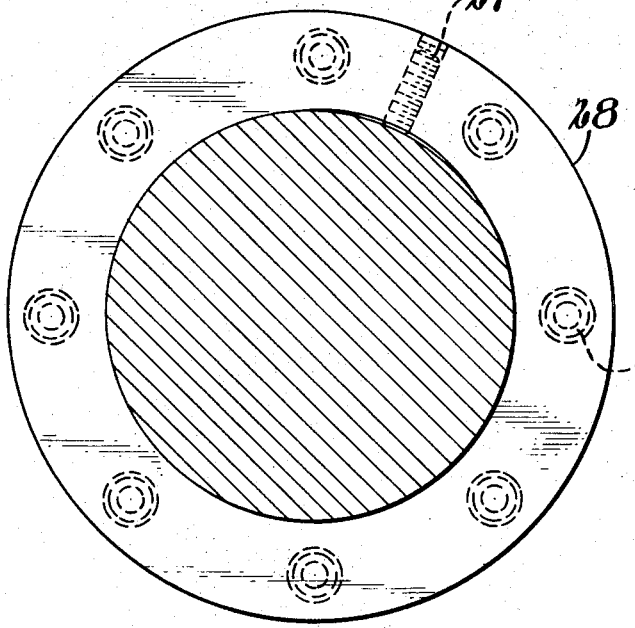
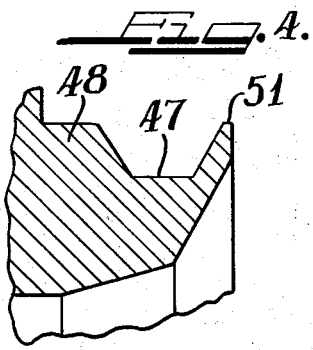
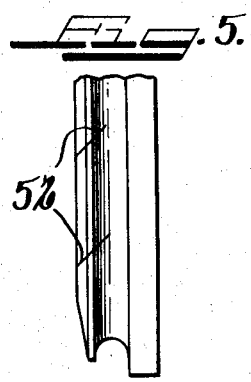
INVENTOR
JAMES A. GRANT
BY
Charles F. Vojtech
Atty.

United States Patent Office 3,360,274
Patented Dec. 26, 1967

3,360,274
LIP SEAL WITH SUPPORTING LIP
James A. Grant, Chicago, Ill., assignor to Crane Packing Company, Morton Grove, Ill., a corporation of Illinois
Filed May 12, 1965, Ser. No. 455,152
9 Claims. (Cl. 277—58)

ABSTRACT OF THE DISCLOSURE

The invention comprises a lip seal for severe vibrating conditions wherein a flexible elastomeric lip in contact with the shaft is supported by a lip of harder flexible material such as polytetrafluoroethylene, the latter lip also contacting the shaft and having slits cut thereinto to accommodate eccentricities in the shaft without creating excessive wear in the said latter lip.

---

This invention relates to rotary mechanical seals and particularly to such seals which depend upon a flexible lip to effect the seal.

The principal object of this invention is to provide a rotary mechanical seal of the lip type which is capable of absorbing greater radial vibration between the relatively rotatable members to be sealed than can be handled effectively by the ordinary lip seals.

Another object of this invention is the provision of a lip type seal for handling radial vibrations of more than average amplitude between the relatively rotating members to be sealed, wherein said seal is made of a relatively hard material for improved wear characteristics with auxiliary soft sealing means to insure an effective seal at all times.

Another object of this invention is the provision of a two-part seal for relatively rotatable machine elements, one part being a radially slitted ring of relatively hard material such as polytetrafluoroethylene, adapted to encircle and contact a rotatable machine element, and the other part being a flexible elastomeric lip adapted to overlie the slits in the first part to prevent leakage therethrough.

As a specific object, this invention seeks to provide a two-part seal for relatively rotatable machine elements, one part being a ring of relatively hard material such as polytetrafluoroethylene adapted to encircle and contact one of said machine elements and the other part being a radially expansible and contractible sealing element of elastomeric material which effects a seal between the hard ring and the other of said machine elements, said other part being capable of accommodating a plurality of sizes of rings and machine elements.

These and other objects of this invention will become apparent from the following detailed description of a preferred embodiment thereof when taken together with the accompanying drawings in which FIG. 1 is a quarter-sectional view of a seal assembly incorporating this invention, the seal being shown installed between a rotatable shaft and a housing around said shaft;

FIG. 2 is an end elevational view of a portion of the sealing assembly to which this invention is applied, said figure being taken along line 2—2 of FIG. 1 and looking in the direction of the arrows at the ends thereof;

FIG. 3 is an enlarged quarter-sectional view of the portion of the novel seal which is made of harder material;

FIG. 4 is a fragmentary and enlarged quarter-sectional view of a part of the housing to which the seal of this invention is applied; and FIG. 5 is a fragmentary plan view of the portion of the seal of this invention which is made of hard material.

For purposes of illustration, this invention will be described and shown with reference to its application to a seal the function of which is to create a chamber around a primary seal in which chamber cooling liquid under slight pressure is circulated. Thus in FIG. 1 there is shown a rotatable shaft 10 passing through an opening 11 in a housing 12 which may be the housing of a pump of a vaned or centrifugal type (not shown) wherein the centrifugal force required to produce the desired head in the liquid pumped is derived from shaft 10.

Opening 11 is partly closed by a seal seat ring 13 which is formed with a radially extending flange 14, one side 15 of which abuts against a gasket 16 which bears against a face 17 of housing 12. Said side 15 is urged against gasket 16 by a cover plate 18 which is formed with a recess 19 in which flange 14 is retained. A second gasket 20 is disposed between flange 14 and the radial wall 21 of the recess 19, so that when cover plate 18 is bolted in place against housing face 17, flange 14 is clamped between gaskets 16 and 20.

Cover plate 18 is formed with an opening 22 into which the seal seat face 23 extends. It may be noted that the contents of the pump fill the opening 11 and can flow through an annular opening 24 between the seal seat ring 13 and shaft 10 to the exterior of the pump. Such flow, however, is prevented by a seal shown generally at 25 which functions as a primary seal for the pump. In the form chosen to illustrate this invention said primary seal 25 is comprised of an annular housing 26 which encircles the shaft and is secured for rotation therewith by one or more set screws 27 (FIG. 2). Said annular housing has a cylindrical outer surface 28 and an annular recess 29 extending axially into the housing from the left hand end thereof as viewed in FIG. 1.

Within recess 29 is disposed a portion of a sealing washer 30, the remainder of sealing washer 30 protruding out of the recess and terminating in a radially disposed face 31 which bears against seal seat face 23 with a fluid-tight running fit. Washer 30 is urged against face 23 of the seal seat 13 by a plurality of helical springs 33 which are symmetrically spaced around the housing 26 and are disposed in spring recesses 34 formed in the bottom of the annular recess 29. The force of the individual springs 33 is distributed uniformly over the back face 35 of sealing washer 30 by a metal washer 36 which is interposed between said springs and said face. A flexible seal is formed between washer 30 and shaft 10 by an endless ring 37 having a circular radial cross-section and commonly known as an O-ring.

It is desirable in certain installations to cool the faces 23 and 31, as well as to remove any of the fluid which leaks past such faces. A convenient means for accomplishing this result is a second seal 32 which provides a seal between the cover plate 18 and the cylindrical outer surface 28 of the primary seal 25. The second seal 32 thus forms a closed annular chamber 38 in which the fluid escaping from between the faces 31 and 23 may be captured and carried away by a flushing and cooling liquid introduced into the chamber 38 from the exterior by passageway 39 formed in the cover plate 18 and connected by suitable means (not shown) to a source of flushing and cooling fluid. It is understood that a second passageway (not shown) similar to 39 would be supplied, one of said passageways being then the inlet and the other the outlet for the said cooling and flushing fluid.

It has been found that primary seals constructed in the manner of seal 25 herein and secured to a shaft by one or more set screws, become distorted by the outward pressure created by the set screws so that the outer surface 28 of the housing thereof becomes non-circular and eccentric with respect to the axis of shaft 10. Thus seal 32 must not only be able to accommodate the relative speeds involved, but must also be able to move rapidly enough in a radial direction to follow accurately and at all times the movement of the surface 28.

In prior art seals which have been proposed for this particular application, the seal used was a lip seal, the lip of which was made from an elastomeric material held against surface 28 by a garter spring. The elastomeric material was soft so that it could be deformed by the spring to take the shape of surface 28. Thus the position of the lip was determined by its contact with the rotating surface 28, and any eccentricities or out of round condition of said surface 28 were reflected directly upon the lip and created periodic forces on the lip, which, because of the inertia of the lip and its associated parts, accelerated wear of the lip and also produced minute voids or separations between the lip and surface. This wear and the inertia-produced voids caused excessive leakage of the fluid past the lip seal.

In the present invention the secondary seal 32 is comprised of two seal rings, one of which is a ring 40 of a relatively hard material which rides on surface 28 through a radially inwardly extending lip 44, and the other of which is a lip seal 41 forming part of a unitary elastomeric ring. The remainder of the elastomeric ring comprises two spaced annular beads 46 and 49 resembling O rings in radial cross-section and connected by a flexible diaphragm 45. Lip seal 41 is a part of diaphragm 45 and extends inwardly therefrom in frusto-conical relation to the axis of the elastomeric ring.

Bead 46 is retained in a groove 47 (FIG. 4) formed in the outer surface of an axially extending flange 48 on cover plate 18, and bead 49 is retained in a groove 50 (FIG. 3) formed on the exterior of ring 40. Both of the beads 46 and 49 are of slightly smaller diameter than their respective grooves, so that said beads exert a radially inwardly directed force either upon their respective grooves or upon an edge of the groove to effect a fluid-tight seal thereat. Thus, bead 46 causes diaphragm 45 to be contracted upon a sharp lip 51 (FIG. 4) defining the edge of groove 47, and bead 49 is contracted upon groove 50.

The elastomeric ring of secondary seal 32 is preferably made from rubber, natural or synthetic, or a combination of the two, and ring 40 is preferably made of polytetrafluoroethylene, which is a semi-hard material having a waxy surface with a low coefficient of friction.

It is contemplated that ring 40 may wear and, accordingly, lip 44 is slit at intervals around its inner periphery, as shown at 52 in FIG. 5, the slits extending upwardly through the flange 42 and into a portion of the groove 50. Said slits 52 are directed angularly with respect to the axis of the ring 40, so that axial pressure upon said lip will tend to close the slits while at the same time allowing relative movement between the slit parts of the ring to increase or decrease the diameter thereof. The angular disposition of the slits render lip 44 sensitive to the direction of rotation of surface 28; if the direction is clockwise as viewed from the left of FIG. 1, the slits will tend to close, and they will tend to open if the direction of rotation is reversed. The angle of the slits should be selected to cause them to close for the rotation encountered. Lip 44 forms a barrier or seal for the contents of chamber 38 which may find their way past the lip seal 41. Said lip seal 41 is pressure-sensitive and functions as a flap to cover slits 52.

In operation, shaft 10 is rotated by any suitable power source (not shown) and with it is rotated the primary seal 25 with its housing 26 and external cylindrical surface 28. If said surface 28 has become eccentric, or if the shaft itself is eccentric or has a radial vibration, surface 28 will similarly move in a radial direction and, in addition, may have irregularities in its surface caused by the set screw 27. Fluid from the pump that escapes past the surfaces 23 and 31, passes into the opening 22 and into the chamber 38 defined thereby where it is carried away by a flushing fluid introduced thereinto through the passageway 39 from the exterior of the pump. Said flushing fluid exerts a pressure upon the lip seal 41 to hold it against the surface 28 and also against the ring 40, thus covering slits 52. Since lip seal 41 is pressed against ring 40, it follows the vibrations of ring 40, so that the radial forces acting upon the lip seal 41 are those created by the ring 40 rather than by surface 28. Said lip seal 41 is therefore largely protected from destructive forces and hence has a longer life.

The internal diameter of lip 44 on ring 40 is made initially equal to or slightly large than the outer diameter of retainer 26. This ensures a condition wherein slits 52 are not opened upon installation, and in fact, permits the exercise of contractile forces upon lip 44 by bead 49 to provide a closing force upon said slits which continues to act during wear of lip 44 and thus prolongs the useful life of ring 40. Each portion of a lip between slits can move independently of the remainder of lip 44 and hence, as each portion encounters an irregularity in surface 28 it can move to accommodate the irregularity. Thus only the inertia of a small portion of ring 40 need be overcome and hence the destructive forces acting upon ring 40 are greatly reduced. Ring 40 is thus capable of use with surfaces 28 which vary in diameter, and can follow surface 28 even though the ring may wear.

It may be apparent thus that the foregoing embodiment of this invention provides a means for sealing an irregular or variable-sized opening with a ring of harder material, the latter taking its position from a surface defining the opening and expanding and contracting or deforming as required by wear and eccentricity of the said surface. The sealing lip 41 provides an additional seal not only at the said surface, but also across the slits in the ring of harder material. The diaphragm connecting the ring of harder material to the cover plate allows said ring to move freely relative to the cover plate and thereby protects said ring from periodic shocks resulting from eccentricity of the surface against which it seals.

In one typical example, the retainer or housing 26 was made of brass, and the cooling liquid was water. In such environment, rubber does not wear well as a sliding sealing element and hence a second seal which depends solely on a rubber lip does not last long in any event. By relying upon a ring of harder material as the principal seal, a longer life can be expected of the second seal. Thus a material can be selected, regardless of its relative inflexibility, to function well in the fluid and materials to be sealed, and material such as polytetrafluoroethylene, which functions well in water against brass, can be readily used.

It may be noted that since slits 52 are angularly disposed relative to the axis of ring 40, the slits will tend to close when the direction of rotation of surface 28 is clockwise, as viewed from the left in FIG. 5. Thus the frictional forces developed between lip 44 and surface 28 may be utilized to close slits 52.

It is understood that the foregoing description is merely illustrative of a preferred embodiment of this invention and that the scope thereof is not to be limited thereto, but is to be determined by the appended claims.

I claim:

1. A mechanical seal for sealing an annular opening between relatively rotating machine elements, said seal comprising a ring of relatively hard material encircling one of said elements, a radially extending lip on said ring constacting the said one of said elements, said lip having slits therein to lend flexibility to said lip, each of said slits having two ends and being angularly disposed relative to the axis of the ring with one end of each of said slits circumferentially displaced from the other end thereof to accommodate expansion and contraction of said lip, an elastomeric ring encircling said one of said elements, means effecting a fluid-tight seal between the elastomeric ring and the other of said relatively rotatable elements, means effecting a fluid-tight seal between the elastomeric ring and the ring of relatively hard material, and means for effecting a seal across the slits in the ring of relatively hard material.

2. A mechanical seal as described in claim 1, said means for effecting a fluid-tight seal between the elastomeric ring and the other of said relatively rotatable elements comprising an annular bead integral with the elastomeric ring, and an axially extending flange on the said other of said relatively rotatable elements, the annular bead being contracted upon said flange.

3. A mechanical seal as described in claim 1, said means for effecting a fluid-tight seal between the elastomeric ring and the ring of harder material comprising an annular bead integral with the elastomeric ring contracted upon said ring of harder material.

4. A mechanical seal as described in claim 1, said means effecting fluid-tight seals between the elastomeric ring and the other of said relatively rotatable elements and the ring of relatively hard material comprising spaced annular beads on the elastomeric ring, and an axially extending flange on the said other of said relatively rotatable elements, one of said annular beads being contracted upon the axially extending flange and the other of said annular beads being contracted upon the ring of relatively hard material.

5. A mechanical seal as described in claim 1, said ring of relatively hard material having a peripheral groove extending radially toward said lip to reduce the radial cross-section thereof and said means for effecting a fluid-tight seal between the elastomeric ring and the ring of harder material comprising an annular bead integral with the elastomeric ring disposed in said peripheral groove and exerting a contractile force therein to hold said lip against the said one of said relatively rotatable elements.

6. A mechanical seal as described in claim 1, said means for effecting a seal across the slits comprising a lip on the elastomeric ring and disposed to overlie the slits.

7. A mechanical seal as described in claim 1, said means for effecting a seal across the slits comprising a lip on the elastomeric ring contacting the said one of said relatively rotatable elements and disposed to overlie the slits.

8. A mechanical seal as described in claim 1, said elastomeric ring being readily deformable to follow relative radial movements between the relatively rotatable elements, and said means for effecting a seal across the slits in the ring of relatively hard material comprising a lip of elastomeric material responsive to fluid pressure and adapted to be pressed against said slits by said fluid pressure, said lip of elastomeric material being supported by and movable with the ring of harder material.

9. A mechanical seal as described in claim 8, said lip being integral with the elastomeric ring.

References Cited

UNITED STATES PATENTS

| 1,804,874 | 5/1931 | Hribar | 285—110 X |
| 2,975,799 | 3/1961 | Stilwell | 285—111 X |
| 3,099,454 | 7/1963 | Walinski | 277—82 X |
| 3,204,988 | 9/1965 | Ouderkirk et al. | 277—188 X |
| 3,271,003 | 9/1966 | Floessel et al. | 277—188 X |

FOREIGN PATENTS 1,258,972  3/1961  France.

LAVERNE D. GEIGER, *Primary Examiner.*

J. S. MEDNICK, *Assistant Examiner.*